JOSEPH V. KIDD
INVENTOR.

BY Carl B. Fox, Jr.
ATTORNEY

Nov. 18, 1969                    J. V. KIDD                    3,478,717
         PRESSURE BALANCED MECHANICAL DETECTOR WITH PERMANENT MAGNETIC
                       MEANS ACTIVATING INDICATOR MEANS
Filed March 4, 1968                                        2 Sheets-Sheet 2
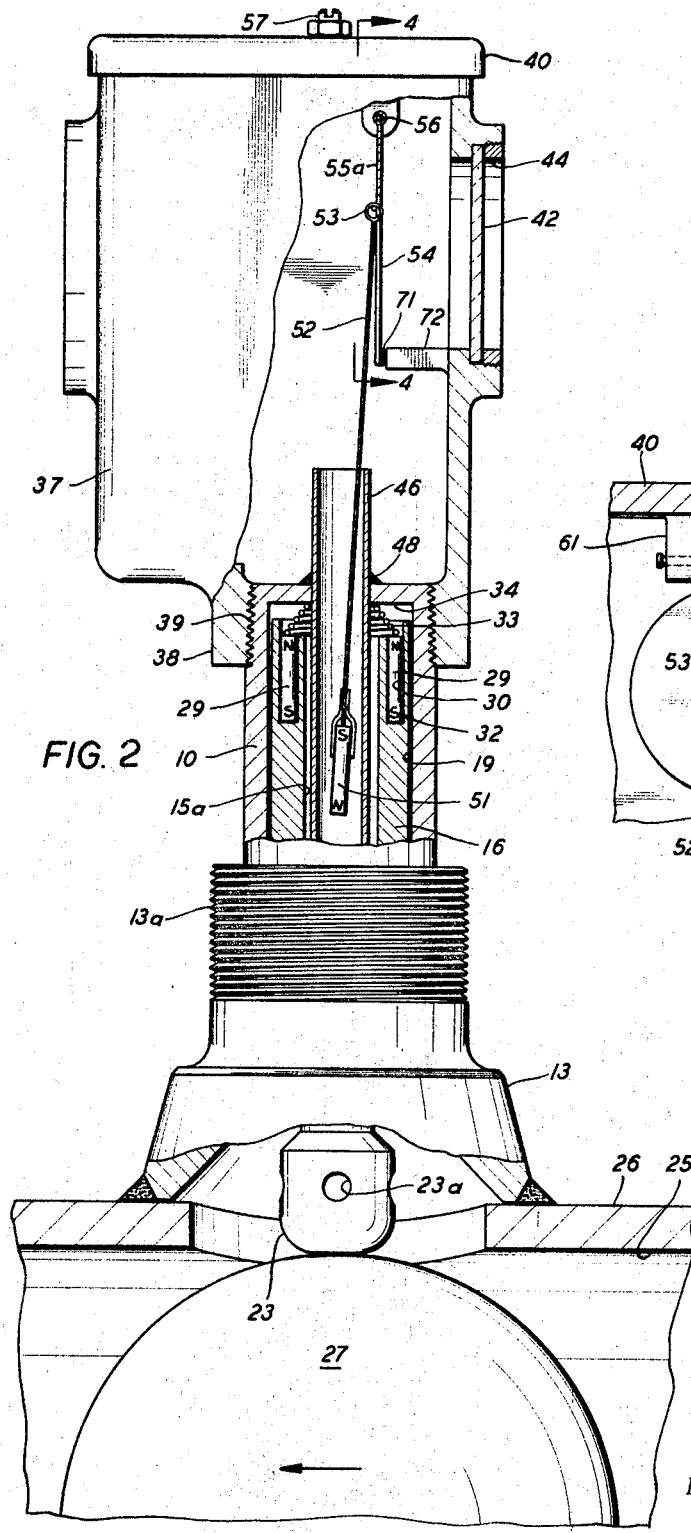
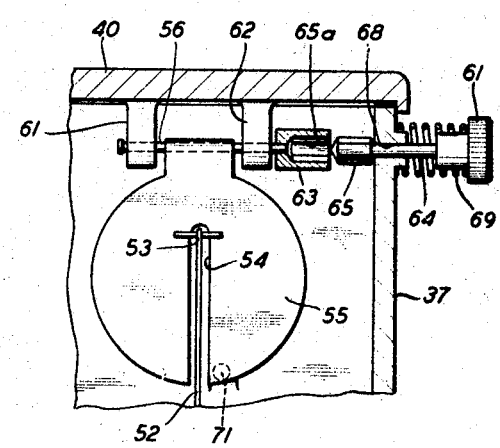
FIG. 2
FIG. 4
JOSEPH V. KIDD
INVENTOR.
BY Carl B. Fox, Jr.
ATTORNEY

United States Patent Office 3,478,717
Patented Nov. 18, 1969

3,478,717
PRESSURE BALANCED MECHANICAL DETECTOR WITH PERMANENT MAGNETIC MEANS ACTIVATING INDICATOR MEANS
Joseph V. Kidd, 201 Shasta, Houston, Tex. 77024
Filed Mar. 4, 1968, Ser. No. 710,311
Int. Cl. G09f 9/00; H01h 3/16
U.S. Cl. 116—124          8 Claims

ABSTRACT OF THE DISCLOSURE

The disclosure relates to indicating detector actuators which are operated by contact of an object with a probe element of the indicator, the probe and object being disposed within a pressure system, the indicator being isolated from the pressure. The invention will be of use in detecting the presence of, or passage of, objects past the location of the detector, for example, for detection of the passing of a ball, sphere or pig separator through a pipeline under pressure, as well as for many other diverse uses.

BACKGROUND OF THE INVENTION

Field of the invention

The field of the invention is detector devices. The apparatus provided according to this invention is actuated by contact of an object with a probe contact portion of the device, which indicates such contact. A principal use of the invention falls in the art wherein ball or pig separators are used in pipelines for separating fluids flowing through the pipelines, the detector indicating the passage of the balls or pigs past the detector. The detector may function as an actuator for electrical switches and for other devices.

SUMMARY OF THE INVENTION

The invention pertains to detector apparatuses which, as well as having other uses which will become apparent, are useful for the detection of the presence or passage of objects which contact the detector. The detector is actuated by contact of an object with a probe. The probe carries one or more magnets which move with the probe. Inside a pressure tube disposed through an opening in the probe, a signal magnet is disposed for movement longitudinally within the pressure tube. The probe and its magnet(s) move longitudinally exterior of the pressure tube. The signal magnet is disposed with its poles opposite the direction of the poles of the probe magnet(s), so that the signal magnet is repelled by the probe magnet(s) when the signal magnet is located beyond the end(s) of the probe magnet(s), at either end, and is attracted when located laterally adjacent to the probe magnet(s). When the apparatus is preset for operation, the probe is extended, and the probe magnet(s) are away from the signal magnet which is repelled to against a stop. When the probe is depressed, the probe magnet(s) are moved with the probe toward a position laterally adjacent the signal magnet, and when the probe magnet(s) movement has progressed sufficiently the signal magnet is moved by magnetic attraction in the direction opposite the direction of probe movement and continues moving by its momentum to then be magnetically repelled in the same direction. A signal attached to the signal magnet is moved to a signal position by this movement of the signal magnet, to indicate to the operator that the probe has been depressed by passage of a sphere or pig, or the like, through the pipeline in which the detector is installed.

All, or at least most, of the apparatus parts, except for the magnets, are made of non-magnetic materials, and the magnet movements are not affected by magnetism induced in other portions of the detector. A primary problem solved by the invention is the provision of a detector or actuator of which most functional elements may be replaced while the assembly is connected to a pipeline carrying fluid under pressure, or to another form of pressure vessel, the actuating portion of the apparatus being exterior of and separated from the fluid in the pipeline, the probe portion extending into the pipeline to be contacted by the ball or pig or other object. Provision is also made whereby changes in pressure in the pipe line or other pressure system do not affect or actuate the detector or actuator, so that it may be employed with various and changing fluid pressures in a pipeline or in other equipment. The detector is therefore entirely pressure balanced, may be serviced under full pipeline operating conditions and pressure, and has no packing or other dynamic seals exposed to pipeline fluid and pressure. In addition, the detector requires no power supply and need not be connected to any other equipment whatsoever.

BRIEF DESCRIPTION OF THE DRAWINGS

FIG. 2 is a vertical cross sectional view taken as FIG. 1, showing the detector in actuated condition.

FIG. 4 is a partial vertical cross sectional view taken at line 4—4 of FIG. 2.

DESCRIPTIONS OF THE PREFERRED EMBODIMENTS

Figure 1:
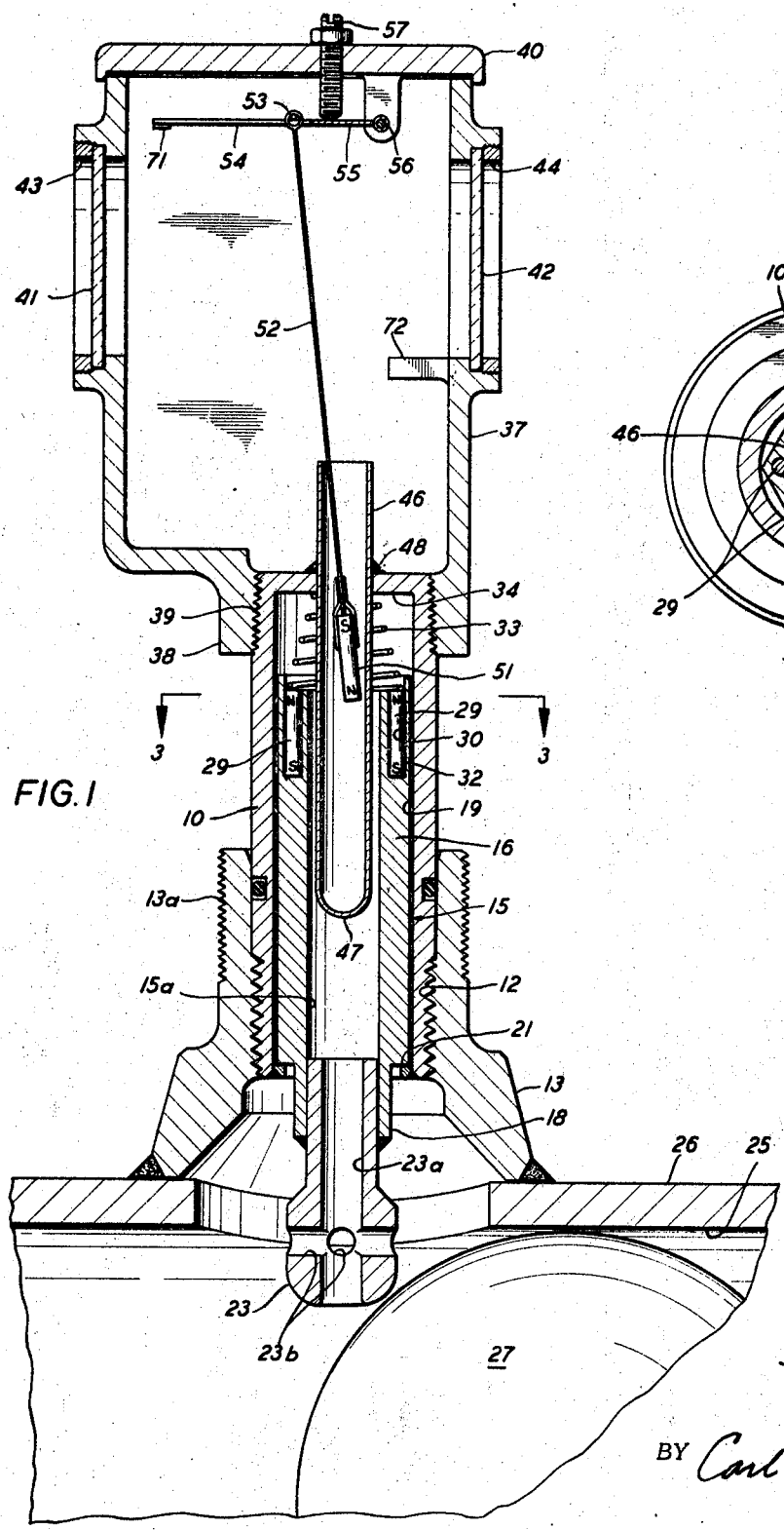
FIG. 1 is a vertical cross sectional view taken along the axis of the principal housing of the apparatus.
Figure 3:
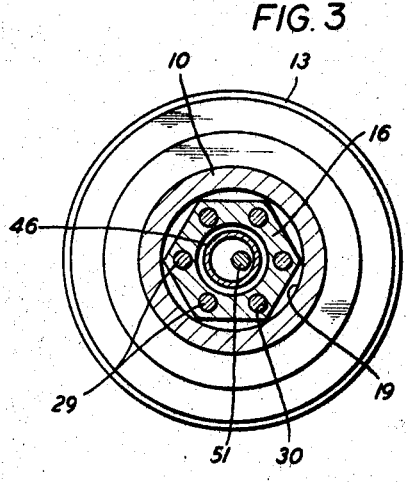
FIG. 3 is a horizontal cross sectional view taken at line 3—3 of FIG. 1.

Referring now to the drawings, there is shown a cylindrical tubular body or housing 10, the lower exterior end of which is threaded at 11 and screwed into the threaded socket formation 12 of a lateral outlet fitting 13 of a pipeline or other pressure system. A probe body 15 which is in the form of a right regular hexagonal prism at its upper part 16 and which is of reduced cylindrical form at its lower portion 18, is received within cylindrical chamber or cavity 19 of housing 10. An annular inwardly projecting shoulder 21 in the form of an annular ring welded within housing 10 retains body 15 therewithin. The lower end of probe 15 is formed by a contact element 23 positioned and welded to extend the correct distance, usually between ¼ inch and about ¾ inch, preferably about ½ inch, into the interior 25 of the pipeline 26 or other pressure system. The enlarged and rounded lower end of the contact element 23 is in a position to be contacted by a sphere 27 or other object within the pipe or system.

Probe portion 16 may be of any cross sectional shape which will permit flow of fluids, gas or liquid, therepast, in order that movements of probe 15 will not occur as a result of pressure fluctuations in the pipeline or other pressure system with which the detector is used.

One or more magnets 29, six being shown, are fixedly disposed, by press-fitting, cementing, or other suitable manner, within bores 30 circularly spaced around the upper end of probe body 15. The magnets 29 are surrounded by plastic or other insulation 32 so as to be unaffected by electrical currents passing through the apparatus, as for example, currents produced by cathodic or other electrical protection of the pipeline. A compression spring 33 bearing against the underside of end 34 of housing 10 and against the recessed upper end of body 15 biases body 15 to its lowermost position against shoulder 21. The spring 33 is preferably of the type having progressively enlarged loops so that it may be pressed completely flat upon upward movement of probe 15.

An upper housing 37 is connected at lower threaded socket outlet 38 to upper threads 39 of body 10. Outlet 38 is offset adjacent one side of housing 37. Housing 37 has an upper cover plate 40 which is tightly fitted to the upper end of housing 37, and which may be secured in other manner, such as screws, or the like. Housing 37 has at opposite sides a pair of transparent windows 41, 42 each held in place in a window opening by the threaded rings 43, 44, respectively.

Top 34 of housing 10 has a concentric circular hole therethrough into which is mounted a pressure tube 46, this tube being cylindrical and having closed lower end 47. Tube 46 is welded in place at weld 48. A magnet 51 is supported freely within tube 46 at the lower end of a rod 52. The upper end of rod 52 is pivotally attached by loop 53 at the end of slot 54 of disc 55, the slot permitting the disc to move past the rod to its position 55a (FIG. 2). Disc 55 is hinged at pin 56 horizontally crossways of the upper end of the interior of housing 37. Disc 55 is pivotally movable between its position as shown in FIG. 1 and its downwardly moved position 55a shown in FIG. 2. The magnet 51 is in a downwardly moved position within tube 46 when disc 55 is moved to its position 55a shown in FIG. 2. The adjustment screw 57 may be adjusted to extend to further or lesser degrees below top 40 of housing 37 in order to adjust the limit of upward movement of disc 55. As will be clarified later, the location of the uppermost position of disc 55 as limited by screw 57 adjusts the sensitivity of the detector.

Referring to FIG. 4 of the drawings, the hinge rod or pin 56 by means of which disc 55 is hinged beneath cover 40, the pin 56 being disposed through perforations in mounting brackets 61, 62 extending beneath the cover, has at one end a socket fitting 63. A rod 64 has a formed head 65 at one end which is insertable in socket 65a of fitting 63. The shapes of head 65 and socket 65a are such that the head when inserted in the socket cannot rotate relatively therein. Rod 64 extends to the outside of housing 37 through a passage 68 which is closely fitted about the rod. A spring 69 bears against the housing and the underside of a pushbutton 61 mounted on the outer end of rod 64. When button 61 is depressed against the bias of compression spring 69, head 65 is received into socket 65a so that disc 55 may be rotated by turning the button from its position 55a to its raised position 55 as shown in FIG. 1. This motion resets the disc and magnet 51 for a subsequent detection of a sphere, or the like, in the pipeline or vessel.

The magnet or magnets 29 have their like poles disposed in the same direction. In other words, all of the magnets 29 will have like poles at both their upper and lower ends. The magnet 51 is positioned to be of opposite polarity. If the magnets 29 have their north poles positioned upwardly, then magnet 51 will have its north pole positioned downwardly, as is indicated in FIGS. 1 and 2. When magnet 51 and magnets 29 are in the relative positions as shown in FIG. 1, that is, with magnet 51 in an elevated position whereby the upper north poles of probe magnets 29 repel the lower north pole of signal magnet 51 upwardly, then these magnetic forces will retain magnet 51, rod 52, and disc 55 in their raised positions as shown in FIG. 1. When an object, such as a sphere 27 passing along a pipeline, engages the end of contact element 23, the contact element and probe 15 are forced to a raised position farther into passage 19 of housing 10. The compressive force of spring 33 is overcome to enable this movement of the probe. Magnets 29 are moved upwardly relative the uppermost position of magnet 51 as limited by screw 57, and the north poles of magnets 29 are moved to above the north pole of magnet 51 so that the north poles repel each other and the north poles of magnets 29 are attracted by the upper south pole of magnet 51. At the same time the lower south poles of magnets 29 attract the lower north pole of magnet 51 so that due to these magnet attractions magnet 51 is moved downwardly within tube 46. The downward momentum of magnet 51 causes magnet 51 to continue moving downwardly toward its position shown in FIG. 2, with the lower south poles of magnets 29 repelling the upper north pole of magnet 51 downwardly. The movement downward of magnet 51 causes rod 52 to pull disc 55 pivotally downward to position 55a of FIG. 2 wherein the disc is directly behind window 42. In this position, the disc may be viewed from the exterior of housing 37. Disc 55 may be made a bright or fluorescent color in order to be more readily viewed when it is in its position 55a.

A small magnet 71 mounted on the outer end of disc 55 magnetically attracts inwardly extending member 72 of housing 37, disposed below window 42, to releasably hold disc 55 in its position 55a. Depression and turning of button 61 will pull magnet 71 free, during resetting of the apparatus. Magnet 71 and member 72 are not essential to operation of the apparatus and may be omitted.

After the sphere 27 has passed by contact element 23, spring 33 returns the probe to its lowered, or extended, position of FIG. 1. But the disc 55 remains in its lowered position since magnet 51 is still downward with respect to magnets 29 so that the downward magnetic forces are in play. The disc 55 may be returned to its upper horizontal position by depression and rotation of button 61 as has been described.

The window 41 admits light into the interior of housing 37 so that the disc may be more readily viewed. The disc may be viewed from either side, but more readily through window 42. If desired, it is possible through appropriate linkages to position another disc 55 to be directly viewed through window 41.

When the uppermost position of disc 55 is adjusted downward by extension of screw 57 into housing 37, the sensitivity of the detector is increased. The uppermost position of magnet 51 is lowered so that a lesser depression of probe 15 will move magnets 29 to positions relative magnet 51 such that the downward movement of magnet 51 will occur.

The pole positions of magnets 29 and 51 may be reversed, with the south poles of magnets 29 up and with the south pole of magnet 51 down.

Contact 23 of probe 15 has therethrough and thereacross the flow passage 23a and 23b. These flow passages, in cooperation with longitudinal flow passage 15a of probe body 15 permit free access of fluid about the probe in passage 19. Fluid may readily flow around the exterior of the probe because of the hexagonal cross section at its upper portion 16. This prevents the probe from reacting and being falsely actuated by changing or surges of pressure within the pipeline. The pressure is balanced about the probe so that the probe is not compelled to move in either direction because of the fluid pressure. The fluid does not enter tube 46 or housing 37, the upper parts of the apparatus being completely pressure sealed from the fluid in the pipeline. It will be noted that housing 37 and the elements connected to magnet 51 may be completely removed and replaced while the device is mounted on a pipeline under pressure. Through use of a pressure chamber device, which may be screwed onto exterior threads 13a of fitting 13, the entire detector may be removed from the pipeline with the pipeline under fluid pressure conditions.

As has been mentioned, components of the detector may be made of non-magnetic materials in order that interference with the magnetic fields will not occur. Suitable materials include stainless steel, Monel, aluminum, and various other alloys and metals. Plastics may also be employed in construction of the apparatus. Depending on the strength of the magnets, consideration must be given to the weights of the magnet 51, rod 52 and disc 55, in order that their weights will not overcome the upward magnetic forces which retain magnetic 51 in the upper position. The apparatus may be made for operation in any position, turned sideways or upside down from the positions shown in the drawings. In any position, the device is stable and not affected by vibration, as the magnetic forces retain the components in their required positions.

The apparatus may be constructed for detection of objects with the probe moved in the opposite direction, i.e. outwardly. The relative magnet arrangement would be as described, but reversed, with the signal magnet moving inward in the direction opposite the outward probe movement in response to the object detected. Such apparatus, for example, could be used to detect spheres or pigs passing through a pipe, with a rod or lever arrangement contacted by the sphere or pig moving the probe outwardly.

While the invention has been disclosed showing the signal means as a hinged disc or flag moved by the magnet movement, it will be understood that the magnet movement may be adapted to operate other signal devices, such as electrical switches and relays, other forms of visible signals, audible signals, or the like. It will also be understood that parts of the apparatus may be elongated to place the signal farther away from the probe if desired, such as, for example, if a pipeline to which the probe is affixed is buried beneath the ground or is beneath the surface of a body of water.

While preferred embodiments of the invention have been shown and described, many modifications thereof may be made by a person skilled in the art without departing from the spirit of the invention, and it is intended to protect by Letters Patent all forms of the invention falling within the scope of the following claims.

I claim:

1. Indicating detector apparatus of the type actuated by contact by an object, comprising a probe movable by contact thereof by an object, first magnet means movable with said probe, second magnet means movably disposed in the magnetic field of said first magnet means and magnetically compelled for movement in one direction when disposed in one terminal portion of said magnetic field and magnetically compelled for movement in the opposite direction when disposed in other portions of said magnetic field, signal means movably supported at a location spaced from said second magnet means and connected to said second magnet means to support said second magnet means in said magnetic field of said first magnet means and for movement thereby upon movement of said first magnet means and its said magnetic field, whereby when said probe and first magnet means are moved by contact by an object said magnetic field is moved with respect to said second magnet means and said second magnet means is magnetically compelled to move in said opposite direction to move said signal means.

2. The combination of claim 1, said probe means having passage means thereinto, said first magnet means being disposed within one end of said probe around said passage means, tubular means having a closed end extending into said passage means, said second magnet means being disposed within said tubular means, housing means surrounding said probe sealingly connected to said tubular means, said probe including a contact portion at its other end extending outwardly through an opening of said housing and disposed for said contact by an object, said housing opening being adapted for sealed connection to a pipe or the like into which said contact portion is to extend.

3. The combination of claim 2, said signal means comprising rod means connected at one end to said second magnet means and at its other end to movable indicator means, said rod means extending from said tubular means generally in the direction of movement of said second magnet means.

4. The combination of claim 3, including enclosure means for said signal means having sealed communication with said tubular means, window means in said enclosure means, said indicator means comprising pivotal plate means disposed within said enclosure and moved for viewing through said window means when said second magnet means is moved in said opposite direction to indicated contact of said probe by an object.

5. The combination of claim 4, including flow passage means through said probe and past said probe in said housing whereby fluid pressure changes within said housing do not tend to move said probe.

6. The combination of claim 5, including insulation means around each said magnet means to eliminate interference with the magnetism thereof.

7. The combination of claim 5, including means for adjusting the length of said contact portion of said probe means.

8. The combination of claim 4, including adjustable stop means to limit the movements of said pivotal plate means and said second magnet means in said one direction, adjustment of the terminal position of said second magnet means closer toward said other portions of said magnetic field by adjustment of said stop means, but still within said one terminal portion thereof, decreasing the extent of probe movement necessary to cause magnetic movement of said second magnet means in said other direction whereby the sensitivity of the detector is increased.

References Cited

UNITED STATES PATENTS

| | | | |
|---|---|---|---|
| 3,140,690 | 7/1964 | Siebel | 116—70 |
| 3,421,124 | 1/1969 | Kidd | 200—61.41 X |
| 2,671,834 | 3/1954 | Kmiecik | 335—207 X |
| 2,722,763 | 11/1955 | Miner et al. | 340—282 X |
| 2,782,407 | 2/1957 | VerNooy | 340—282 |
| 2,951,135 | 8/1960 | Ovshinsky | 335—207 |
| 3,051,805 | 8/1962 | Binford | 335—205 X |
| 3,109,410 | 11/1963 | VerNooy | 116—124 |
| 3,145,274 | 8/1964 | VanScoy et al. | 200—61.41 |
| 3,247,342 | 4/1966 | Ott et al. | 335—207 |

ROBERT K. SCHAEFER, Primary Examiner

R. A. VANDERHYE, Assistant Examiner

U.S. Cl. X.R.